Nov. 9, 1937.   C. W. THOMPSON   2,098,473
ELECTRICAL SWITCH
Filed Nov. 4, 1936   2 Sheets-Sheet 1
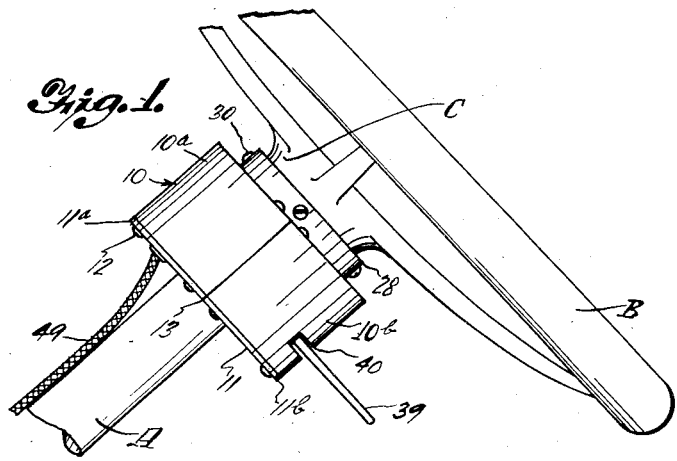
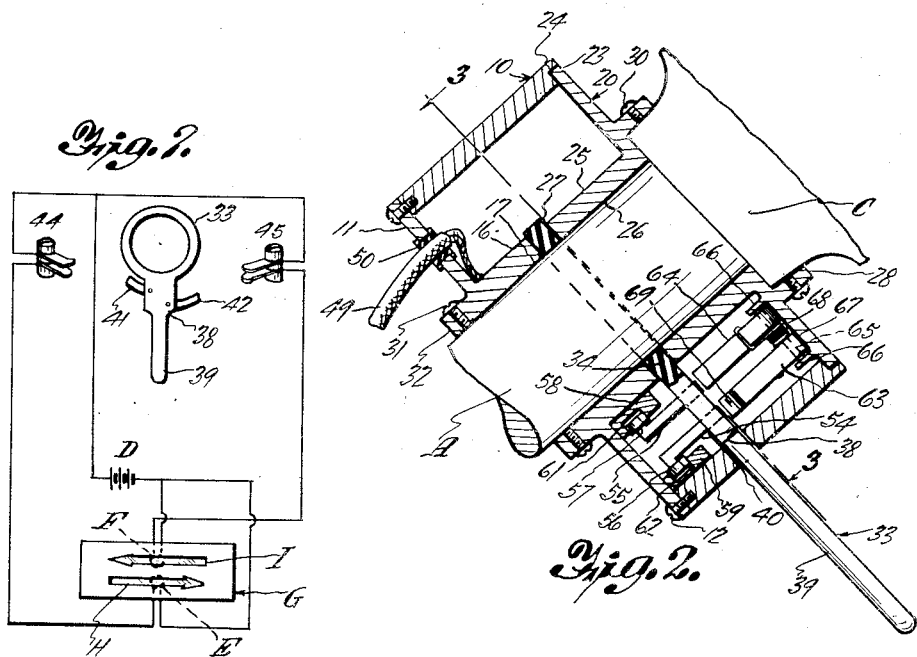
Inventor
CHARLES W. THOMPSON
By Adam E. Fisher
Attorney Nov. 9, 1937.   C. W. THOMPSON   2,098,473
ELECTRICAL SWITCH
Filed Nov. 4, 1936   2 Sheets-Sheet 2
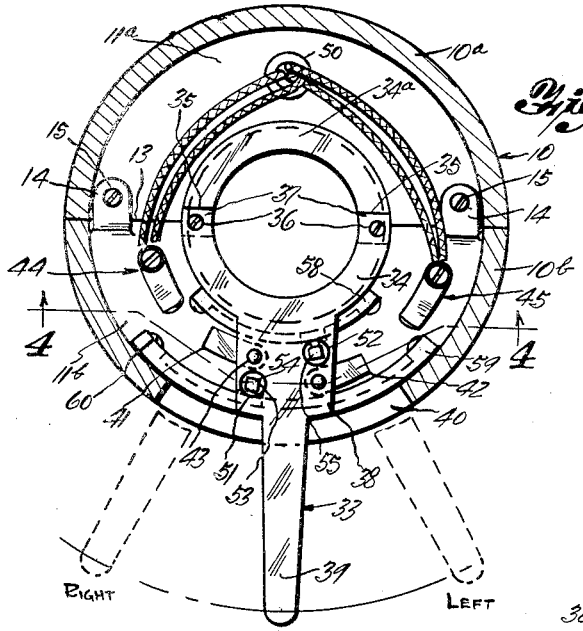
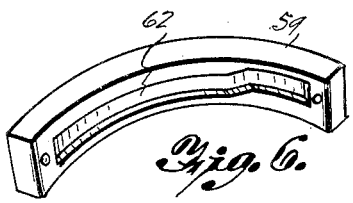
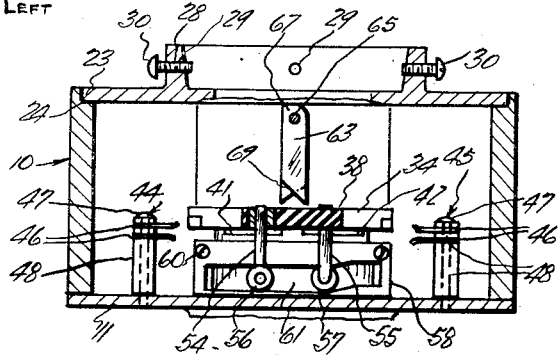
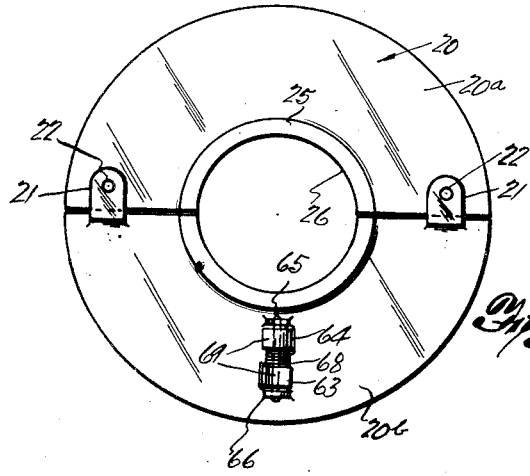
INVENTOR
CHARLES W. THOMPSON
BY Adam E. Fisher
ATTORNEY Patented Nov. 9, 1937

2,098,473

UNITED STATES PATENT OFFICE 2,098,473

ELECTRICAL SWITCH

Charles W. Thompson, Albany, N. Y.

Application November 4, 1936, Serial No. 109,069

2 Claims. (Cl. 200—59)

My invention relates to improvements in electrical switches and the main object is to provide a switch particularly adapted for use in controlling direction indicating signals for automobiles, the switch for this purpose being associated with the steering wheel of the automobile in such manner that when the switch is moved manually to indicate a turn in either direction the switch will then be automatically restored to normal position after the automobile makes the turn indicated.

Another object is to provide a rotary switch for this purpose in simple and durable form and which may be readily assembled on the steering column coaxially therewith so as to project the operating handle of the switch in a convenient position for operation by the driver and to utilize the turning motion of the steering wheel in resetting the switch to normal as described.

A further object is to provide a switch of this kind including a drum-like housing parted diametrically for convenient assembling on the steering column and including an operating handle carrying bridges to bridge circuit controlling contacts when swung to either side from a neutral, central position, there being pins slidable through the handle and operable by cams in the housing to raise and project at their upper ends when the handle is moved to either circuit closing position, and there being dogs carried by the housing top and arranged to engage the raised pins and pull the handle back to neutral position as the said top is rotated by the steering wheel to which it is connected.

With these and other objects in view the invention resides in the novel construction and arrangement of parts as hereinafter fully set forth and claimed, reference being had to the accompanying drawings as showing a preferred embodiment of my invention for purposes of exemplification.

In the drawings:

Figure 1 is a side elevation showing my switch mounted on a steering column and wheel.

Figure 2 is an enlarged cross section through my switch showing also a portion of the steering column and wheel.

Figure 3 is a section along the line 3—3 in Figure 2.

Figure 4 is a section along the line 4—4 in Figure 3.

Figure 5 is an inverted plan view of the housing top alone.

Figure 6 is a perspective view of one of the cam members alone.

Figure 7 is a diagrammatic view showing the wiring of my switch to the turn indicating lamps.

In carrying out my invention I provide a cylindrical or drum-like housing 10 made up of two similar semicircular sections 10a and 10b which when fastened together form an annular housing wall as shown. A circular disk-like bottom plate 11 is employed to hold the sections 10a and 10b together, this bottom being secured by screws 12 at its margins to the lower edges of the sections and being parted as at 13 to form two identical semicircular sections 11a and 11b, one of which sections has ears 14 overlapping the other section and attached thereto by screws 15 to hold the entire assembly together. Obviously, if desired, the two sections of the housing and bottom might be cast each in one integral piece as well as the fabricated form here shown. An annular bearing neck 16 extends centrally from the bottom 11 up into the housing a short distance and has a bore 17 opening at each end.

A cover or upper end plate 20 is provided and same is of flat disk-like form parted diametrically into two identical semicircular sections 20a and 20b held together by ears 21 extended from one section over the other and secured thereto by screws 22. This cover 20 is rotatably seated at its margins 23 in an annular seat 24 cut in the upper edge of the housing 10 and the cover may thus turn freely on this housing. The cover 20 has an annular bearing neck 25 extended from its center downwardly into the housing and having a bore 26, this neck terminating somewhat short of a meeting with the extremity of the aforesaid neck 16 so as to leave a space 27 between, and this cover also has an annular mounting wall or collar 28 extended upwardly concentrical with the neck 25 and having radially spaced tapped openings 29 for the reception of set screws 30.

The whole assembly thus formed may be readily divided into two equal semicircular sections exposing the bores 17 and 26 and the sections may thus be assembled on the steering column A of the usual automobile steering wheel B and then by refastening the parts together they will be supported concentrically on the column immediately below the wheel. The collar 28 is then secured to the hub C of the wheel B by screwing the set screws 30 in against the hub while the housing 10 and connected bottom 11 being secured to the column A in any suitable manner as by the set screws 31 extended through a short annular nipple 32 projecting from the bottom plate as shown. Then as the steering wheel B is turned in the ordinary process of steering the automobile the cover 20 will turn with the wheel while the housing 10 and bottom 11 will remain stationary. Any other method of fastening the housing to the steering column A may be employed and the dimensions varied to meet the exigencies of various installations.

An operating or switch arm 33 made of bakelite or other suitable insulating material is provided and same has a large circular eye 34 at one end adapted to encircle the steering column A in the space 27 between the necks 16 and 25, the said eye for this purpose being parted at diametrically opposed points 35 to provide a removable section 34a which is removed when assembling the switch on the column A. The section 34a is then held in place by screws 36 which pass through its ends and ears 37 extending from the other portion of the eye. From the eye 34 the arm extends outward in the form of a wide shank portion 38 and a reduced narrow handle 39, the latter extending outward freely and radially through an elongated slot 40 formed in the housing 10 on the side below the steering wheel B so that the handle is presented in position convenient for manipulation by the driver. The slot 40 is of such length as to permit a substantial arc of movement for the handle 39.

Contact bridges or shorting strips 41 and 42 are secured by rivets 43 to the operating arm shank 38 and extend therefrom in opposite directions from the lateral margins of the shank. Contact point assemblies 44 and 45 are secured to the bottom 11 at each side of the shank 38 and each comprises spaced contact blades 46 supported on studs 47 and insulated from each other and from the studs by insulating washers 48 in well known manner. These blades 46 are so located and extended that the bridges 41 and 42 will slip between and electrically connect them when the operating arm 33 is swung in either direction to the ends of the slot 40. As shown in Figure 7 these contact blades 46 are wired in series between the automobile storage battery D and the direction indicating lamps E and F of a well known form of direction indicating signal G which has the oppositely turned arrows H and I which will be illuminated by the lamps E and F. The arrangement and wiring is such that by swinging the handle 39 to the left as viewed in Figures 3 and 7 (and as the assembly appears to the driver) the contact assembly 44 will be bridged and the arrow H indicating a right turn will be illuminated. By swinging the handle 39 to the opposite position the assembly 45 will be bridged and the arrow I indicating a turn to the left will be illuminated. In either case a visual signal is given to other drivers indicating the intention to turn on the part of the vehicle equipped with my invention. The wires from the contact assemblies 44 and 45 in my switch may be conveniently cabled as shown at 49 and run through a grommet 50 in the bottom 11 down along the steering column and thence to the battery and signal.

As so far described the switch would require manual resetting to normal or inoperative position after each turn was made. To overcome this objection I provide a means for automatically resetting the switch now to be described.

Metal bearing inserts 51 and 52 are placed in the shank 38 of the operating arm and have square bores 53 which slidably receive the shanks of resetting pins 54 and 55 which depend through the inserts and at their lower ends have oppositely turned bearing pintles on which rollers 56 and 57 are journaled. Arcuate cam members or strips 58 and 59 are secured respectively to the lower neck 16 and the wall of the housing 10 below the slot 40, the mounting being by screws 60 though of course the use of separate strips might be eliminated by casting shoulders on the parts as will be understood. The adjacent faces of the strips 58 and 59 have grooves 61 and 62 in which the rollers 56 and 57 fit and move freely. The groove 61 in the inner strip 58 inclines upwardly at its right end (again as viewed in Figure 3) and thus as the handle 39 is moved to the right to indicate a left turn the roller 56 moving upwardly will project the upper end of the pin 54 above the shank 38. The opposite or left hand end of the groove 62 in the outer strip 59 inclines upwardly and thus as the handle 39 is moved to the left to indicate a right hand turn the upper end of the other pin 55 will be projected upwardly by the roller 57 rolling up on this inclined end of the groove. When the rollers 56 and 57 roll off the inclined ends of the grooves the pins 54 and 55 are pulled down with their upper ends flush with the upper face of the shank 38.

The cover 20 carries a pair of dogs 63 and 64 pivotally mounted on a pin 65 extended radially between lugs 66 cast on the underside of the cover and these dogs depend downwardly as shown so as to just clear the operating arm shank 38 as they are carried thereover by rotation of the cover with the steering wheel B. The dogs 63 and 64 have oppositely turned knees 67 at their upper ends which engage the lower face of the cover 20 to prevent the dogs from pivotal movement except in one direction. Thus the outer dog 63 can swing only to the left as viewed in Figure 4 and the inner dog 64 can swing only to the right. A torsional coil spring 68 coiled around the pin 65 and engaging the dogs at its ends normally prevents such movement and holds the dogs back against their knees 67. The lower extremities of the dogs are also oppositely bevelled as shown at 69.

Now as the handle 39 is swung to the left to give a signal for a right hand turn the pin 53 will be projected upwardly and will lie in the path of the lower end of the outer dog 63. Then as the steering wheel B is turned to make the right hand turn the dog 63 will pass over the pin 53 swinging to clear the same due to the action of the bevel 69. But as the wheel B is turned back to straighten out the vehicle after the turn is made the point of the dog 63 will strike the pin 53 and the dog being held rigid against swinging clear in this direction of movement due to the knee 67 the dog will carry the pin ahead of it until the handle 39 reaches neutral position and the pin 53 accordingly sinks below the path of the dog. The switch is thus automatically restored to neutral or inoperative position by the normal process of turning the steering wheel back to "straight away" position. In making a turn to the left the same action of the dog 64 on the pin 54 occurs and when the turn has been made the switch is again reset at normal.

The many advantages of this automatic resetting operation will be readily apparent and while I have herein set forth a certain preferred embodiment of my invention it is understood that I may vary from the same in minor structural details so as best to provide a practical device for the purposes intended, not departing from the spirit of the invention and within the scope of the appended claims.

I claim:

1. A turn signal switch for mounting upon the steering column of an automobile below the steering wheel thereof, the same comprising a lower annular housing section encircling the column below the wheel, this section including an annular bottom an outer cylindrical wall and an inwardly spaced annular bearing neck extended up from the bottom, the neck encircling and being secured to the column, the outer wall also encircling the column in an outwardly spaced relation, an annular cover plate anchored to the wheel and closing the upper end of the lower housing section, the cover plate being rotatable over the lower section and having a depending annular bearing neck encircling the steering column and extending centrally down into the housing in spaced relation to the upper margin of the bearing neck of the lower section so as to provide an annular space between the two around the column, an operating switch arm formed at its inner end with a flat circular eye slidably encircling the column within the said annular space between the two bearing necks, the outer end of the arm being passed freely out through a slot elongated circumferentially in the outer wall of the lower housing section, and thus arranged for lateral movement, electrical contacts on the opposite margins of the shank of the operating arm within the housing, laterally spaced co-operating contacts within the housing for controlling electrically indicated turn signals such as right and left turns.

2. In the assembly defined in claim 1, the said resetting means comprising arcuate cam members secured in a radial relation below the switch operating arm, one to the bearing neck of the lower housing section and the other to the outer wall of that section, the adjacent faces thereof being grooved with the right end of one groove and the left end of the other groove inclined upwardly, a pair of resetting pins passed slidably through the shank of the switch operating arm within the housing, the pins being locked against rotation and having rollers at their lower ends disposed within said grooves of the cam members and whereby one or the other of the resetting pins is elevated above the surface of the operating arm as the arm is moved to right or left to circuit closing positions, dogs carried by the rotatable cover plate adapted to engage the said pins and actuate the switch operating arm, the dogs being pivotally mounted by knee joints to swing free in opposite directions only and their lower ends being beveled for passing over the elevated heads of the pins on their movement in the one direction but locking against the same pins on their reverse movement, whereby the switch operating arm is automatically moved back to neutral position as the steering wheel is righted after a turn in either direction.

CHARLES W. THOMPSON.